United States Patent
Pham et al.

(10) Patent No.: US 10,205,493 B2
(45) Date of Patent: *Feb. 12, 2019

(54) METHOD AND SYSTEM FOR MU-MIMO COMMUNICATION

(71) Applicant: NEC Corporation, Minato-ku, Tokyo (JP)

(72) Inventors: Duong Pham, Malgrave (AU); Yasushi Maruta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 100 days.

This patent is subject to a terminal disclaimer.

(21) Appl. No.: 15/309,940

(22) PCT Filed: Mar. 19, 2015

(86) PCT No.: PCT/JP2015/059281
§ 371 (c)(1),
(2) Date: Nov. 9, 2016

(87) PCT Pub. No.: WO2015/194227
PCT Pub. Date: Dec. 23, 2015

(65) Prior Publication Data
US 2017/0141822 A1    May 18, 2017

(30) Foreign Application Priority Data
Jun. 16, 2014  (AU)  ................ 2014902281

(51) Int. Cl.
*H04B 7/0456* (2017.01)
*H04W 88/02* (2009.01)
(Continued)

(52) U.S. Cl.
CPC ......... *H04B 7/0452* (2013.01); *H04B 7/0478* (2013.01); *H04B 7/0639* (2013.01); *H04W 88/02* (2013.01)

(58) Field of Classification Search
None
See application file for complete search history.

(56) References Cited

U.S. PATENT DOCUMENTS 8,467,469 B2 * 6/2013 Lee ..................... H04B 7/0473
370/334
9,673,883 B2 * 6/2017 Zhao .................... H04B 7/0691
(Continued)

FOREIGN PATENT DOCUMENTS

EP  2665203 A1  11/2013
WO  2013/112594 A1  8/2013

OTHER PUBLICATIONS

3GPP TSG-RAN WG1 #66, "Considerations on CSI feedback enhancements for high-priority antenna configurations", Alcatei-Lucent Shanghai Bell, Alcatei-Lucent, Agenda Item: 6.6.2.1, R1-112420, Athens, Greece, Aug. 22-26, 2011.
(Continued)

*Primary Examiner* — Mark H Rinehart
*Assistant Examiner* — Angel T Brockman (57) ABSTRACT

A method and system for data communication in a Multi-user Multiple-Input and Multiple-Output (MU-MIMO) system is provided. The method includes receiving, from a first UE of the plurality of UEs, first and second channel information relating to first and second subsets of antennae; generating first and second sub-precoders according to the first and second channel information; generating a precoder according at least in part to the first and second sub-precoders; and transmitting data to the first UE using the precoder.

20 Claims, 9 Drawing Sheets

(51) Int. Cl.
*H04B 7/0452* (2017.01)
*H04B 7/06* (2006.01)

(56) References Cited

U.S. PATENT DOCUMENTS

| | | | |
|---|---|---|---|
| 9,929,789 B2* | 3/2018 | Pham | H04B 7/0639 |
| 2010/0195615 A1* | 8/2010 | Lee | H04J 11/0026 |
| | | | 370/330 |
| 2011/0135033 A1 | 6/2011 | Ko et al. | |
| 2012/0087265 A1 | 4/2012 | Tamaki et al. | |
| 2012/0194385 A1 | 8/2012 | Schmidt et al. | |
| 2014/0177745 A1* | 6/2014 | Krishnamurthy | H04B 7/0413 |
| | | | 375/267 |

OTHER PUBLICATIONS

Extended European Search Report for EP Application No. EP15809873.1 dated Dec. 7, 2017.
3rd Generation Partnership Project; Technical Specification Group Radio Access Network; Intel Corporation, "Further details of 3D/FD MIMO scenarios and antenna models", 3GPP TSG-RAN WG1 #72bis R1-130921, Chicago, USA, Apr. 15-19, 2013, pp. 1-7.
International Search Report for PCT Application No. PCT/JP2015/059281, dated Jun. 16, 2015.
Written Opinion of the International Search Authority for PCT Application No. PCT/JP2015/059281.

* cited by examiner

METHOD AND SYSTEM FOR MU-MIMO COMMUNICATION

This application is a National Stage Entry of PCT/JP2015/059281 filed on Mar. 19, 2015, which claims priority from Australian Patent Application 2014902281 filed on Jun. 16, 2014, the contents of all of which are incorporated herein by reference, in their entirety.

TECHNICAL FIELD

The present invention relates to control signaling in advanced wireless communication networks. In particular, although not exclusively, the invention relates to reporting channel information in MIMO (Multiple-Input and Multiple-Output) systems.

BACKGROUND ART

The following table contains certain abbreviations/acronyms that may be found herein:

TABLE 1

| | |
|---|---|
| CI | Channel Information |
| DL | Downlink |
| eNodeB/eNB | E-UTRAN Node B or evolved Node B |
| E-UTRAN | Evolved Universal Terrestrial Radio Access Network |
| MIMO | Multiple-Input and Multiple-Output |
| MU-MIMO | Multi-user Multiple-Input and Multiple-Output |
| OFDM | Orthogonal frequency division multiplexing |
| OFDMA | Orthogonal frequency division multiple access |
| PMI | Precoding matrix indicators |
| SU-MIMO | Single user MIMO |
| TxAn | Transmit antenna |
| UE | User Equipment |

Wireless communication systems are widely known in which base stations (also known as E-UTRAN Node Bs (eNBs)) communicate with mobile devices (also known as user equipments (UEs)) which are within range of the eNB. Each eNB divides its available bandwidth, i.e. frequency and time resources, into different resource allocations for the different UEs. There is a constant need to increase the capacity of such systems, and to improve the efficiency of resource utilization, in order to accommodate more users (more UEs), more data-intensive services and/or higher data transmission rates.

OFDM (Orthogonal Frequency Division Multiplexing) is one technique used for transmitting data in wireless communication systems. An OFDM-based communications scheme divides data symbols to be transmitted among a large number of subcarriers; hence the term "frequency division multiplexing". Data is modulated onto a subcarrier by adjusting its phase, amplitude, or both phase and amplitude. The "orthogonal" part of the name OFDM refers to the fact that the spacings of the subcarriers in the frequency domain are chosen so as to be orthogonal, in a mathematical sense, to the other subcarriers. In other words, they are arranged in the frequency domain such that the sidebands of adjacent subcarriers may overlap but such that inter-subcarrier interference is sufficiently minimized for the subcarriers to be received.

When individual subcarriers or sets of subcarriers are assigned to different users (different UEs), the result is a multi-access system referred to as OFDMA (Orthogonal Frequency Division Multiple Access). The term OFDM is often intended to include the term OFDMA. The two terms may therefore be considered interchangeable for the purposes of the present explanation. By assigning distinct frequency/time resources to each UE in a cell, OFDMA can help to avoid interference among UEs within a given cell.

A further modification of the basic OFDM scheme is called MIMO which stands for "multiple-input multiple-output". This type of scheme employs multiple antennae at the transmitter and/or at the receiver (often at both) to enhance the data capacity achievable between the transmitter and the receiver. Typically, this is used to achieve enhanced data capacity between an eNB and the user equipment(s) (UE(s)) served by that eNB.

By way of example, a 2×2 "single user MIMO" (SU-MIMO) configuration contains two antennae at the transmitter and two antennae at a single receiver that is in communication with the transmitter. Likewise, a 4×4 SU-MIMO configuration contains four antennae at the transmitter and four antennae at the single receiver that is in communication with the transmitter. There is no need for the transmitter and receiver to employ the same number of antennae. Typically, an eNB in a wireless communication system will be equipped with more antennae in comparison with a UE, owing to differences in power, cost and size limitations. It should also be noted that so called "multi-user MIMO" (MU-MIMO) is often employed, and this involves a single eNB which is able to perform MIMO communication with multiple UEs at once. This is discussed further below.

The term "channel" is commonly used to refer to the frequency (or equivalent time delay) response of the radio link between a transmitter and a receiver. The MIMO channel (hereafter simply the "channel") contains all the subcarriers (see the discussion on subcarriers above), and covers the whole bandwidth of transmission. A MIMO channel contains many individual radio links. The number of these individual radio links, which may each be individually referred to as a single-input single-output (SISO) channel, is $N_{RX} \times N_{TX}$, where $N_{TX}$ is the number of antennae at the transmitter and $N_{RX}$ is the number of antennae at the receiver(s). For example, as a 3×2 SU-MIMO arrangement contains 6 links, it has 6 SISO channels.

Figure 1:
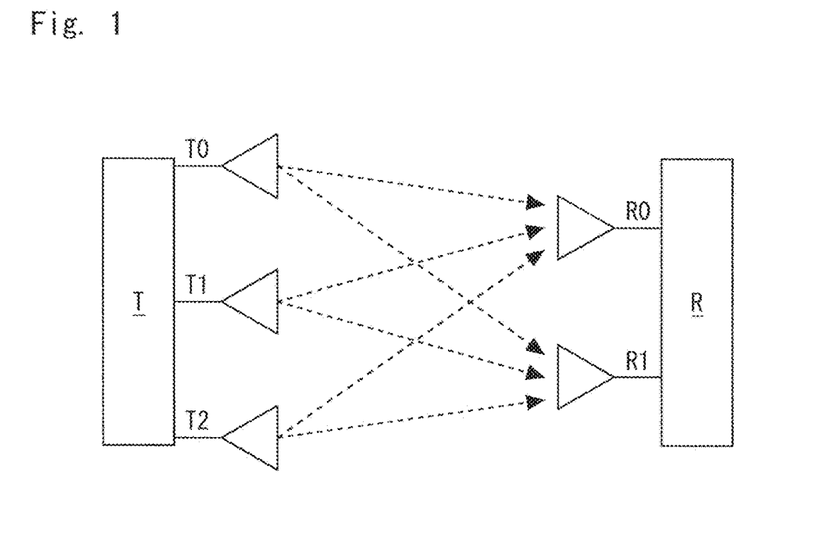
FIG. 1 schematically illustrates a simplified 2×3 SU-MIMO system.

Considering the simplified 2×3 SU-MIMO system schematically represented in FIG. 1, it can be seen that a receiver antenna R0 of receiver R receives transmissions from each of the transmitter antennae T0, T1 and T2 of transmitter T. Similarly, a receiver antenna R1 receives transmissions from transmitter antennae T0, T1 and T2. Therefore, the signal received at the receiver comprises (or is made up of) a combination of the transmissions (i.e. a combination of the six SISO channels) from the transmitter antennae. In general, SISO channels can be combined in various ways to transmit one or more data streams to the receiver.

Figure 2:
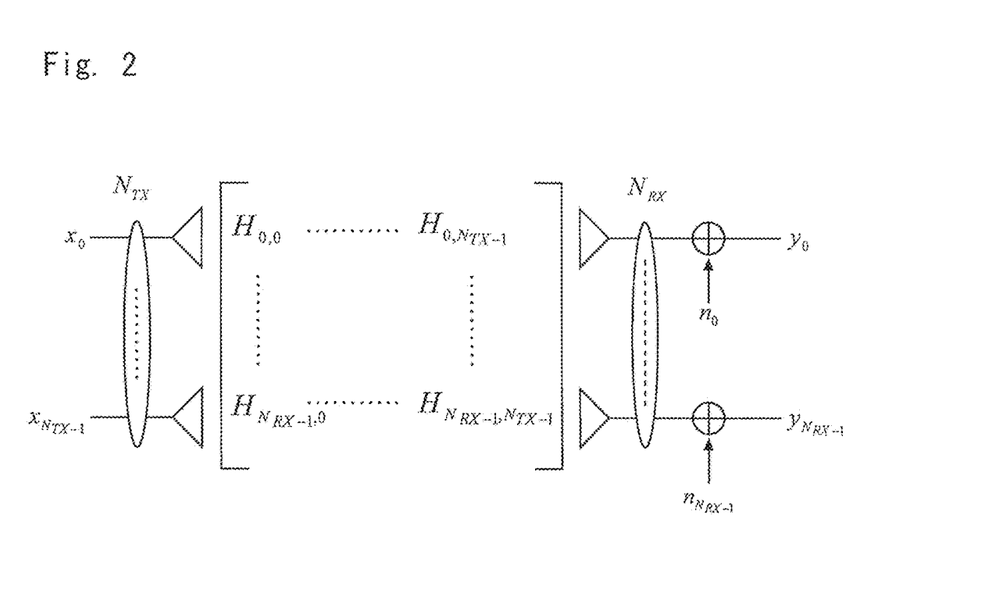
FIG. 2 is a conceptual diagram of a more generalized SU-MIMO system.

FIG. 2 is a conceptual diagram of a more generalized SU-MIMO system. In FIG. 2, a transmitter transmits signals utilizing $N_{TX}$ transmitting antennae, and a single receiver receives the signals from the transmitter utilizing $N_{RX}$ receiving antennae. In order to create a mathematical model of the characteristics of the overall MIMO channel (in this case a SU-MIMO channel), it is necessary to represent the individual SISO channels between the transmitter and receiver. As shown in FIG. 2, the individual SISO channels are represented by $H_{0,0}$ to $H_{N_{RX}-1,N_{TX}-1}$, and as suggested in the Figure, these form terms of a matrix commonly called the "channel matrix" or channel response matrix H. It will be recognized that $H_{0,0}$ represents the channel characteristics (for example, channel frequency response) for transmitting signals from transmitting antenna 0 to receiving antenna 0. Similarly, "$H_{N_{RX}-1,N_{TX}-1}$" represents the channel characteristics for transmitting signals from the transmitting antenna $N_{TX-1}$ to the receiving antenna $N_{RX-1}$, and so on.

In FIG. 2, the symbols $x_0$ to $x_{N_{TX-1}}$, which represent the signal elements transmitted using the transmitting antennae 0 to $N_{TX-1}$ together form a transmitted signal vector $x=(x_0, x_1, \ldots, x_{N_{TX-1}})^T$, where $(\ )^T$ indicates the vector transpose. Likewise, the received signals elements $y_0$ to $y_{N_{RX-1}}$ received by receiving antennae 0 to $N_{RX-1}$ together form received signal vector $y=(y_0, y_1, \ldots, y_{N_{TX-1}})^T$. The relationship between the vectors y and x for the simplified single user system shown in FIG. 2 may be modelled by the basic MIMO system equation:

$$y=Hx+n \quad \text{(Equation 0)}$$

where H is the channel matrix referred to above and ii is a vector representing noise (usually assumed to be additive white Gaussian noise).

It should be noted at this point that FIG. 1 and FIG. 2 (discussed above) both relate to "single user" MIMO (SU-MIMO) systems. However, as also mentioned above, so called "multi-user" MIMO (MU-MIMO) is often employed, and this involves a single eNB having multiple antennae which is able to perform MIMO communication with multiple UEs (each of which may also have multiple antennae) at once. In particular, in MU-MIMO the eNB transmits data to different UEs on the same time-frequency from multiple transmit antennae. To minimize interference between UEs, the eNB creates transmission beams through precoding.

According to Wikipedia for example, "precoding" is a generalization of "beamforming" and is used to support multi-stream (or multi-layer) transmission in multi-antenna wireless communications. In conventional single-stream beamforming, the same signal is emitted from each of the transmit antennae with appropriate weighting (phase and gain) such that the signal power is maximized at the receiver. When the receiver has multiple antennae, however, single-stream beamforming cannot simultaneously maximize the signal level at all of the receiver antennae. In order to maximize the throughput in multiple receiver antenna systems, multi-stream transmission is generally required.

In multi-user MIMO (MU-MIMO), a multi-antenna transmitter communicates simultaneously with multiple receivers (each having one or multiple antennae), as explained above. From an implementation perspective, precoding algorithms for MU-MIMO systems are classified into linear and non-linear precoding types. The capacity achieving algorithms are generally nonlinear, but linear precoding approaches may still achieve reasonable performance with much lower complexity. Linear precoding strategies include, for example, maximum ratio transmission (MRT), zero-forcing (ZF) precoding, and transmit Wiener precoding.

While performance maximization has a clear interpretation in point-to-point MIMO, a multi-user system generally cannot simultaneously maximize the performance for all users. Multi-user systems may therefore be said to involve a multi-objective optimization problem where each objective corresponds to maximization of the capacity of one of the users.

In any case, at the receiving side, a UE uses postcoding (decoding) to obtain its data.

Those skilled in the art will appreciate from the discussion above that precoding is often highly dependent on the state of the channel (i.e. it is dependent on the "channel state")—see below.

Mathematically, a MU-MIMO system can be described (modelled) by modifying the simplified single user MIMO system equation (Equation 0) above as follows:

$$y(i) = H(i)V(i)x(i) + \sum_{k=1, k \neq i}^{N_{UE}} H(i)V(k)x(k) + n(i) \quad \text{(Equation 1)}$$

In Equation 1 above:
y(i) is the received signal at the i-th UE,
x(i) is the data signal for the i-th UE,
H(i) is the channel matrix for the i-th UE,
V(i) is the precoder matrix of the i-th UE,
n(i) is the additive white Gaussian noise at the i-th user.

MIMO transmission schemes may be said to be either "non-adaptive" or "adaptive". In the non-adaptive case, the transmitter does not have any knowledge of the condition or properties of the channel. In other words, the transmitter does not have any knowledge of the way a transmitted signal changes as it is transmitted "through the air". This lack of knowledge regarding the "channel state" can limit performance as the transmitter cannot take account of, for example, changes in conditions which cause changes in the state or properties of the channel (which affect how a transmitted signal changes "in the air"). Adaptive schemes rely on the feedback of information (so-called "channel-state information" or CSI) from the receiver to the transmitter (i.e. in the uplink (UL)), which allows modification of transmitted downlink (DL) signals to account for changing conditions (i.e. to account for the changing channel state) and to maximize data throughput. In other words, the feedback of CSI can be used to facilitate or assist with precoding. The present invention is concerned primarily with these adaptive types of MIMO schemes.

A problem with MIMO systems of the prior art is that they are generally computationally complex.

It is to be clearly understood that mere reference herein to previous or existing devices, apparatus, products, systems, methods, practices, publications or to any other information, or to any problems or issues, does not constitute an acknowledgement or admission that any of those things, whether individually or in any combination, formed part of the common general knowledge of those skilled in the field, or that they are admissible prior art.

SUMMARY OF INVENTION

Technical Problem

The present invention is directed to control signaling in advanced wireless communication networks, which may at least overcome at least one of the abovementioned disadvantages or provide the consumer with a useful or commercial choice.

Solution to Problem

With the foregoing in view, the present invention in one form, resides broadly in a method of data communication in a Multiple-Input and Multiple-Output (MIMO) system including a base station comprising a plurality of antennae and a plurality of user equipments (UEs), wherein the plurality of antennae have been partitioned into a plurality of subsets of antennae, the method including:

generating, at a first UE of the plurality of UEs, first channel information relating to a first subset of the plurality of subsets of antennae;

generating, at the first UE, second channel information relating to a second subset of the plurality of subsets of antennae; and providing the first and second channel information to the base station for generation of a precoder.

Preferably, the first and second channel information comprises pre-coding matrix indicators (PMI).

Preferably, the MIMO system is a Multi-user Multiple-Input and Multiple-Output (MU-MIMO) system.

The partitioning may be predefined. Furthermore, an indicator of the plurality of subsets may be provided to the first UE.

The method may further comprise partitioning a matrix of a 3D communication channel associated with the plurality of antennae into multiple sub-channel matrices to generate the plurality of subsets.

The plurality of subsets of antennae may be disjoint subsets. The first channel information and the second channel information may be jointly calculated. One of the plurality of subsets may comprise a reference subset, wherein the first and second channel information is calculated according to the reference subset. The second channel information may be generated in part according to the first channel information.

The plurality of subsets may be joint subsets. The plurality of subsets may each include one common antenna. The channel information may be independently generated for each of the joint subsets.

According to certain embodiments, generating the precoder comprises stacking sub-precoders corresponding to the channel information of the plurality of subsets. Aspects of the sub-precoders associated with a reference antenna may be removed prior to stacking the sub-precoders.

The plurality of antennae may comprise a 2D array of antennae. In particular, the 2D array of antennae may comprise a 4×4 array of antennae.

Each of the plurality of subsets may comprise four (4) antennae.

The method may further comprise:

generating, at a second UE of the plurality of UEs, third channel information relating to the first subset of the plurality of subsets of antennae;

generating, at the second UE, fourth channel information relating to a second subset of the plurality of subsets of antennae; and providing the third and fourth channel information to the base station for generation of a second precoder.

In another form, the present invention resides broadly in a Multiple-Input and Multiple-Output (MIMO) user equipment (UE) for data communication in a MIMO system including a base station comprising a plurality of antennae, the MIMO UE including a processor and instruction code executable by the processor for:

generating, at a first UE of the plurality of UEs, first channel information relating to a first subset of the plurality of subsets of antennae;

generating, at the first UE, second channel information relating to a second subset of the plurality of subsets of antennae; and providing the first and second channel information to the base station for generation of a precoder.

Advantages of certain embodiments of the present invention include an ability to efficiently generate PMIs in a MU-MIMO system. According to certain embodiments the size of the PMI codebook is small, which enables efficient selection of a PMI on a UE.

Any of the features described herein can be combined in any combination with any one or more of the other features described herein within the scope of the invention.

Advantageous Effects of Invention

According to the present invention, it is possible to provide improved techniques for overcoming at least one of the abovementioned disadvantages or providing the consumer with a useful or commercial choice.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

Figure 3:
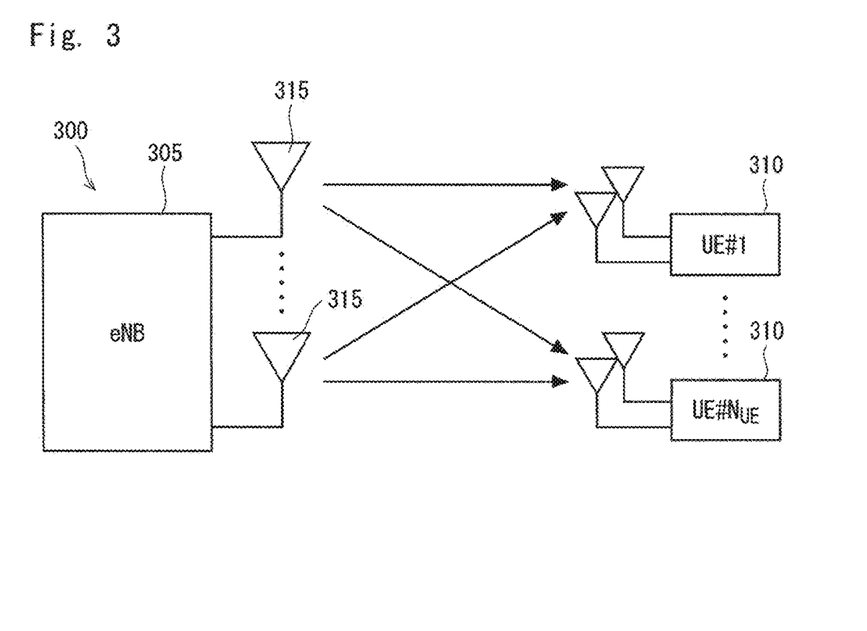
FIG. 3 is a schematic diagram illustrating a Multi-user Multiple-Input and Multiple-Output (MU-MIMO) wireless communication system, according to an embodiment of the present invention.

FIG. 3 is a schematic diagram illustrating a Multi-user Multiple-Input and Multiple-Output (MU-MIMO) wireless communication system 300, according to an embodiment of the present invention.

The MU-MIMO wireless communication system 300 includes a base station in the form of an E-UTRAN Node B (eNodeB) 305 and a plurality of User Equipments (UEs) 310. The eNodeB 305 includes a plurality of antennae 315 for MU-MIMO transmission of data. The wireless communication system 300 thus enables MU-MIMO transmission of data from the eNodeB 305 to the plurality of UEs 310, as discussed in further detail below.

Figure 4:
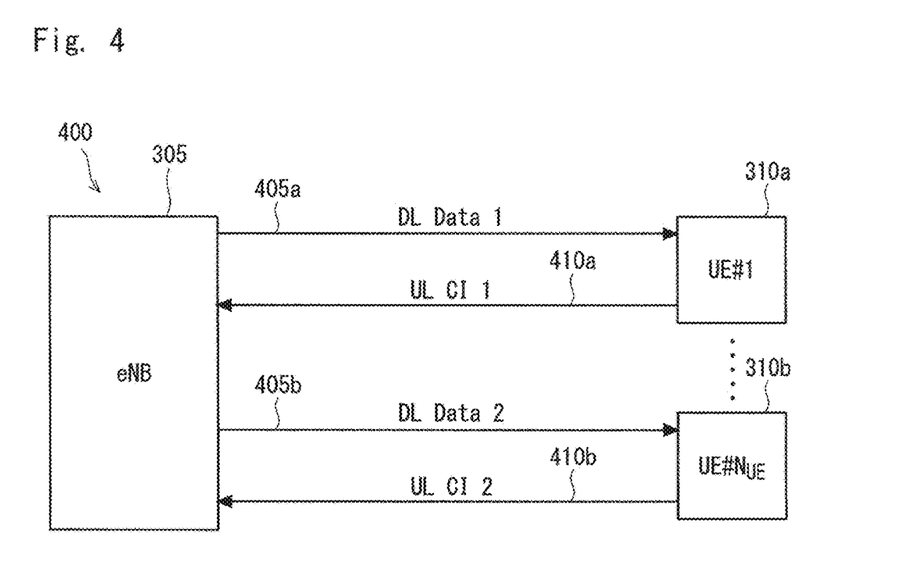
FIG. 4 illustrates a message flow diagram of the MU-MIMO wireless communication system of FIG. 3, according to an embodiment of the present invention.

FIG. 4 illustrates a message flow diagram 400 of the MU-MIMO wireless communication system 300, according to an embodiment of the present invention.

First downlink data is transmitted from the eNodeB 305 to a first UE 310a of the plurality of UEs 310, as illustrated by 405a (downlink (DL) data), and second downlink data is transmitted from the eNodeB 305 to a second UE 310b of the plurality of UEs 310, as illustrated by 405b (downlink (DL) data). Upon reception of the first data, the first UE 310a generates channel information (CI) in the form of a first set of precoding matrix indicators (PMIs). Similarly, the second UE 310b generates channel information in the form of a second set of PMIs.

The first set of PMIs is transmitted to the eNodeB 305 by the first UE 310a, as illustrated by 410a (uplink (UL) CI), and the second set of PMIs are transmitted to the eNodeB 305 by the second UE 310b, as illustrated by 410b (uplink (UL) CI). The eNodeB 305 uses the first and second sets of PMIs to generate precoders for the first and second UEs 310a, 310b respectively.

The feedback of the channel information (e.g. PMI) from the receiver to the transmitter enables the eNodeB 305 to modify downlink (DL) signals to account for changing conditions and to maximize data throughput. In particular, the UEs 310 search through codebooks of PMIs for a PMI that best represents the characteristics of the channel.

Figure 5:
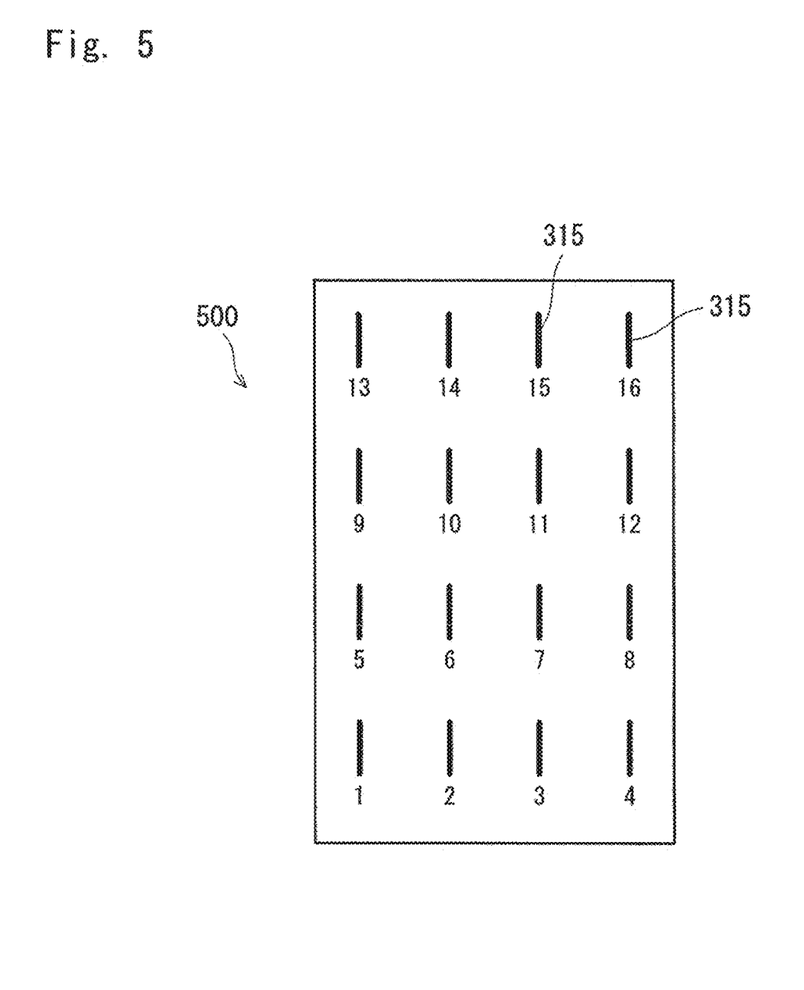
FIG. 5 illustrates a two-dimensional (2D) antenna array, according to an embodiment of the present invention.

The plurality of antennae 315 define a two-dimensional (2D) antenna array 500, as illustrated in FIG. 5, according to an embodiment of the present invention. As the 2D antenna array 500 is two-dimensional (i.e. 4×4 antennae), the communication channel becomes three-dimensional (3D).

The 2D antenna array 500 is partitioned into multiple subsets, and channel information in the form of PMIs is generated for each of the subsets. In particular, the first UE 310a will generate PMIs for at least a first subset and a second subset of the plurality of antennae 315. As such, complexity is reduced at the first UE 310a as generating PMIs for each of the subsets of antennae is less computationally complex than generating a single PMI for all of the antennae.

The PMIs are then provided to the eNodeB 305, where at least first and second sub-precoders are generated based upon the first and second PMIs. Finally, a precoder is generated according to the first and second subprecoders, for later communication with the first UE 310a.

As described in further detail below, the antenna subsets may be joint subsets (i.e. with at least one common antenna) or disjoint (i.e. without any common antennae). Similarly, the PMIs may be jointly or independently calculated, and either with or without reference to a reference subset or reference antenna.

The eNodeB 305 may explicitly or implicitly provide, to the first UE 310a, an indicator of the plurality of subsets. For example, the eNodeB may send a partition configuration identifier to the first UE 310a, identifying if (and which) partitioning has been used.

Figure 6:
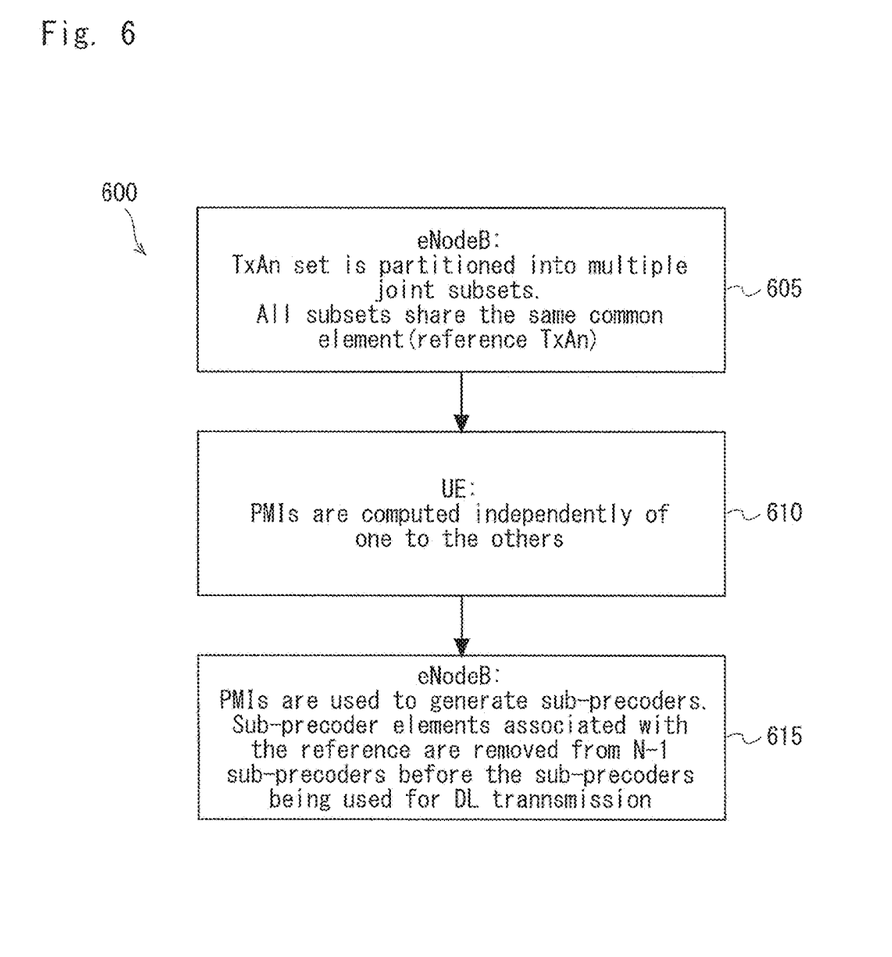
FIG. 6 illustrates a method of generating a precoder for data communication in the MU-MIMO system of FIG. 3, according to an embodiment of the present invention.

FIG. 6 illustrates a method 600 of generating a precoder for data communication in the MU-MIMO system 300, according to an embodiment of the present invention.

At step 605, the plurality of antennae 315 are partitioned into a plurality of joint subsets. In particular, at least one antenna of the plurality of antennae 315 is common to all of the plurality of subsets. Although the plurality of antennae are advantageously partitioned at the eNodeB 305, they may be partitioned according to a predefined pattern.

Figure 7:
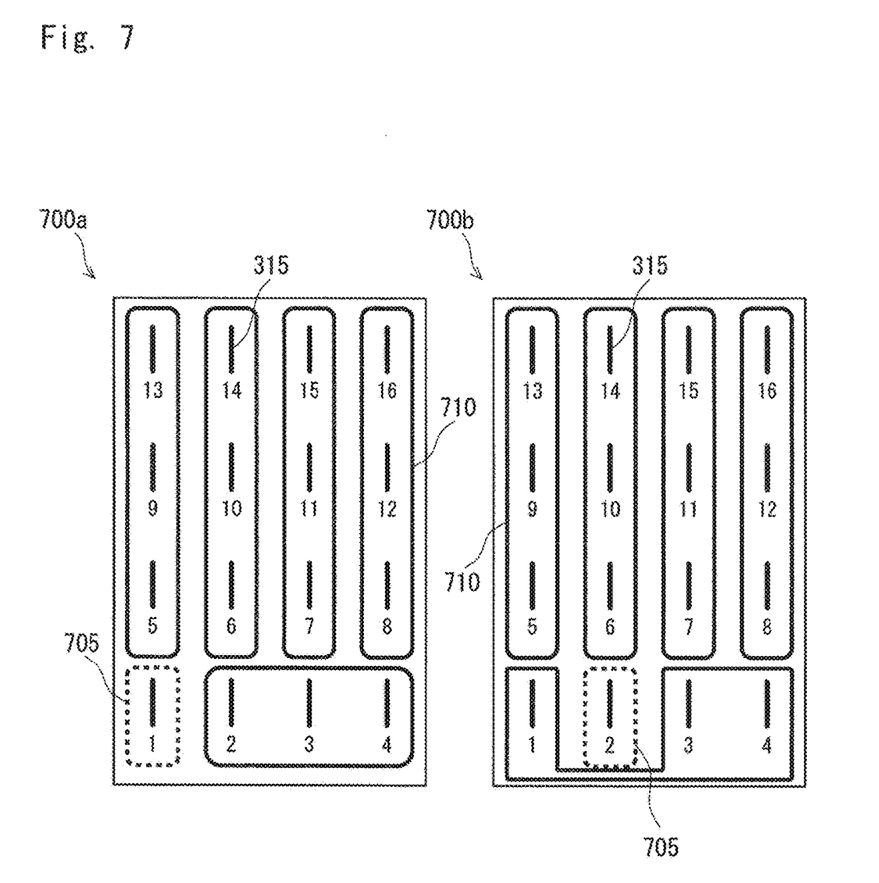
FIG. 7 illustrates first and second example partitionings of a plurality of antennae, according to the method of FIG. 6.

FIG. 7 illustrates first and second example partitionings 700a, 700b of the plurality of antennae 315 according to the method 600. The example partitionings 700a, 700b each include a reference antenna 705 and a plurality of partial antenna groups 710.

The subsets of antennae thus each include four members—three members from one of the partial antenna groups 710 and the reference antenna 705.

Referring now back to FIG. 6, PMIs are computed for each of the subsets at step 610. The PMIs are computed independently for each of the groups, i.e. the computation of one PMI for one group is independent of another PMI for another group. For example, in the first example partitioning 700a, the UE 310 computes 5 PMIs, i.e. one for each of the following antenna subsets: {1,2,3,4}, {1,5,9,13}, {1,6,10,14} {1,7,11,15}, {1,8,12,16}.

The PMIs are then transmitted to the eNodeB 305.

At step 615, the PMIs are used to generate sub-precoders, which are in turn used to generate a precoder. The precoder can then be used to precode data for a later transmission.

In particular, the reported PMIs are first used to generate sub-precoders, one sub-precoder corresponding to each PMI. The rows associated with the reference antenna of N−1 sub-precoders are then removed before the sub-precoders are stacked to generate the precoder. For example, in the first example partitioning 700a, the first row of the sub-precoders corresponding to the subsets {1,5,9,13}, {1,6,10,14} {1,7,11,15}, {1,8,12,16} is removed (to leave only 3 rows) before being stacked to generate the final precoder.

Figure 8:
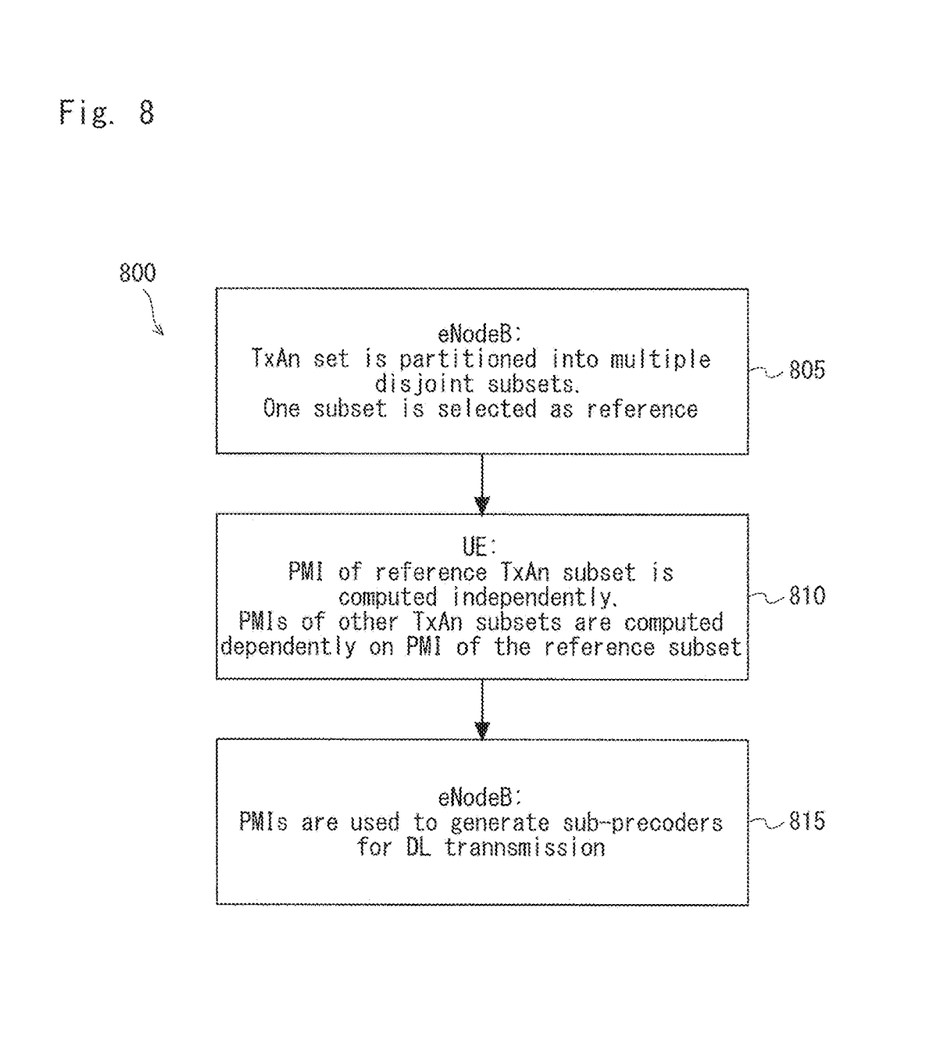
FIG. 8 illustrates a method of generating a precoder for data communication in the MU-MIMO system of FIG. 3, according to an alternative embodiment of the present invention.

FIG. 8 illustrates a method 800 of generating a precoder for data communication in the MU-MIMO system 300, according to an alternative embodiment of the present invention.

At step 805, the plurality of antennae 315 are partitioned into a plurality of disjoint subsets. In particular, the antennae 315 are not common to any of the plurality of subsets.

Figure 9:
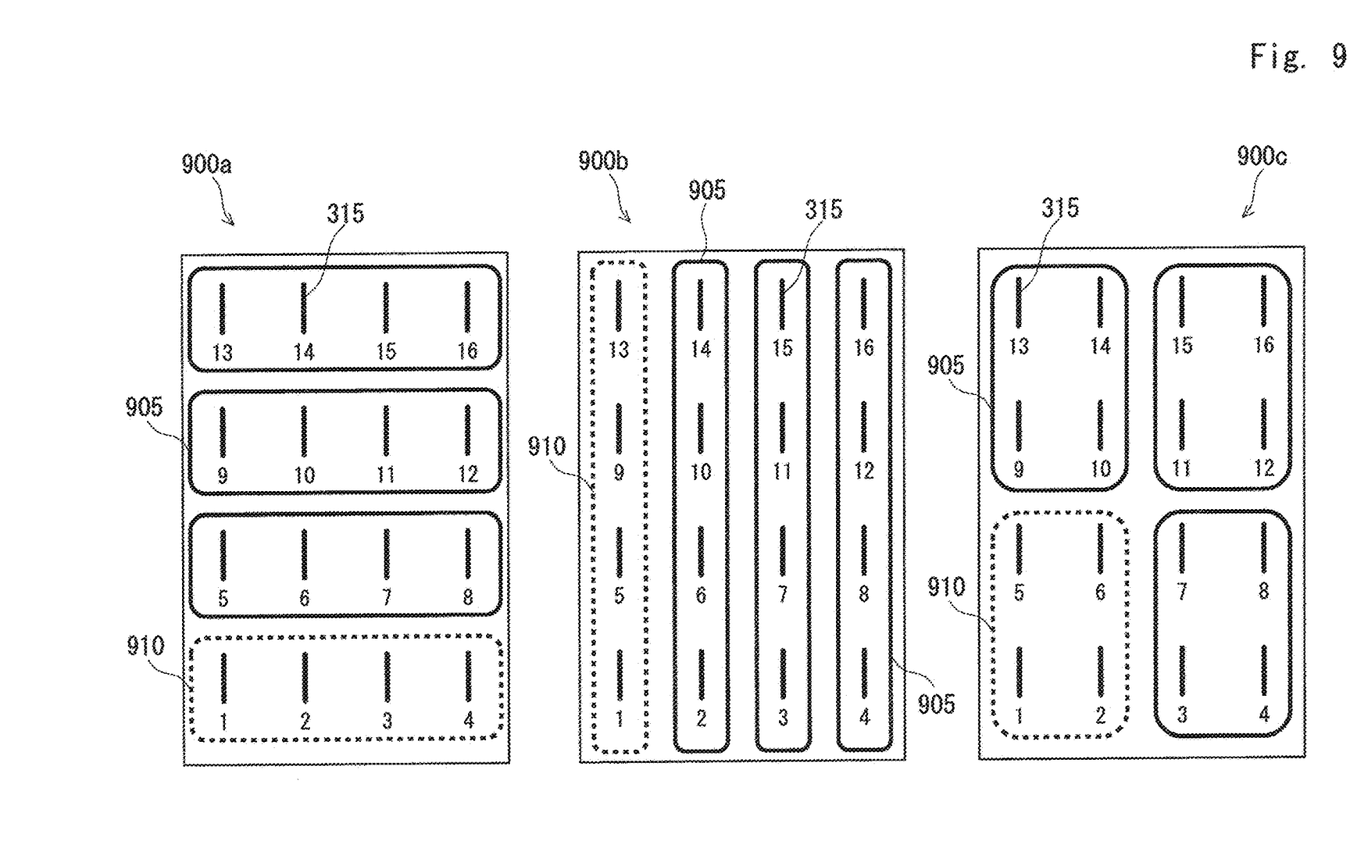
FIG. 9 illustrates example partitionings of a plurality of antennae, according to the method of FIG. 8.

FIG. 9 illustrates example partitionings 900a, 900b, 900c of the plurality of antennae 315, according to the method 800. The example partitionings 900a, 900b, 900c each include four subsets 905, wherein each of the subsets 905 includes four antennae 315. The four subsets 905 include a reference subset 910.

Referring now back to FIG. 8, PMIs are computed for each of the subsets 905 at step 810. The PMI for the reference subset 910 is first computed independently of the other subsets 905. The PMIs for the remaining subsets 905 are then computed dependently of the PMI of the reference subset 910.

The PMIs are then transmitted to the eNodeB 305.

At step 815, the PMIs are used to generate sub-precoders, which are in turn used to generate a precoder. The precoder can then be used to precode data for in a later transmission.

Figure 10:
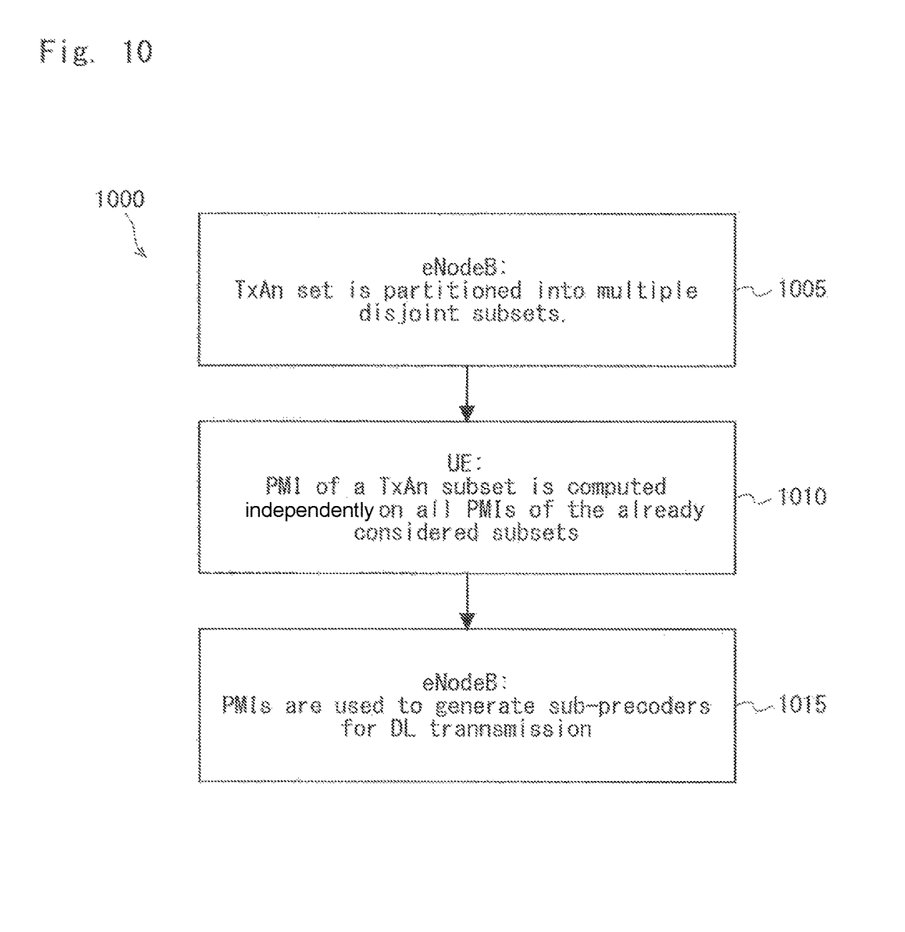
FIG. 10 illustrates a method of generating a precoder for data communication in the MU-MIMO system of FIG. 3, according to another alternative embodiment of the present invention.

FIG. 10 illustrates a method 1000 of generating a precoder for data communication in the MU-MIMO system 300, according to another alternative embodiment of the present invention.

At step 1005, the plurality of antennae 315 are partitioned into a plurality of disjoint subsets. In particular, the antennae 315 are not common to any of the plurality of subsets.

Figure 11:
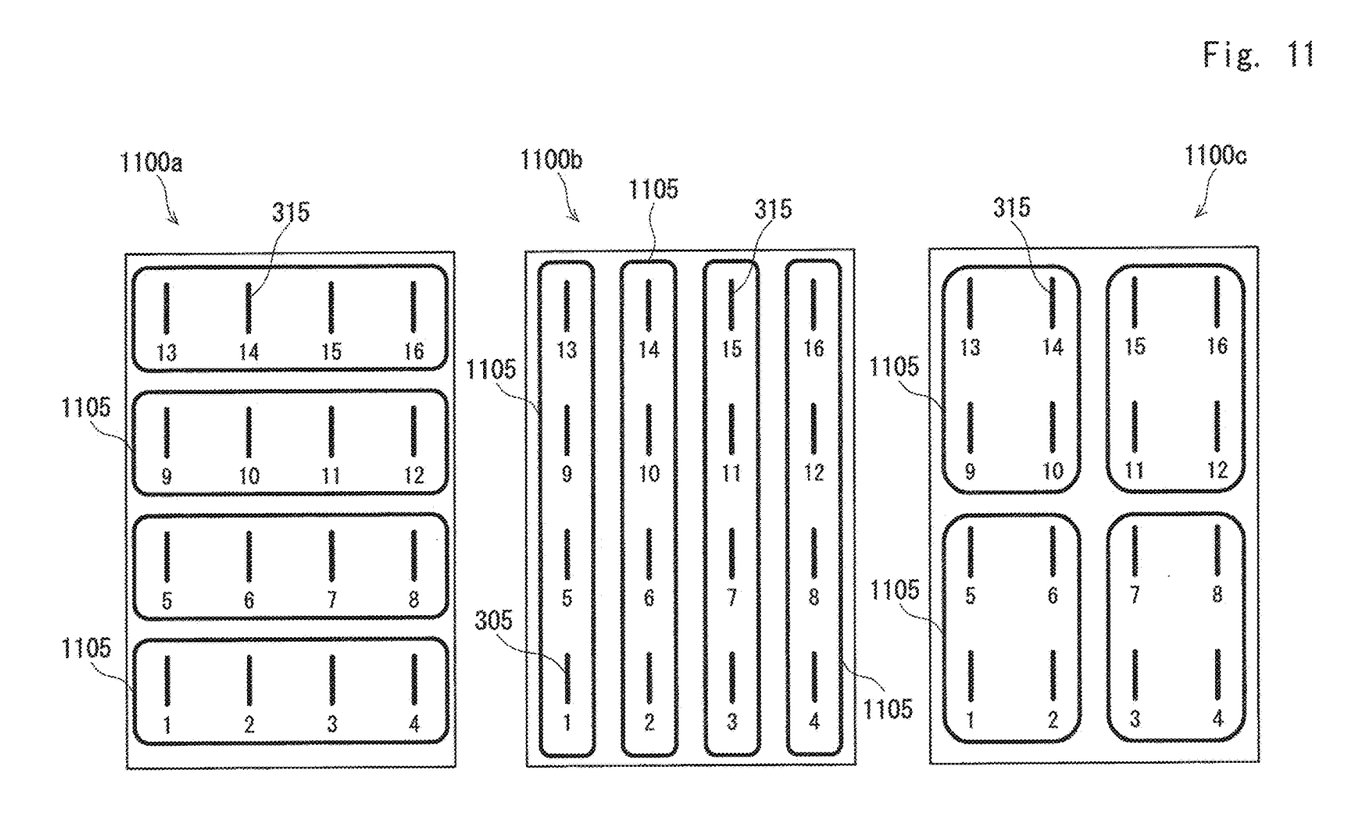
FIG. 11 illustrates example partitionings of a plurality of antennae 315, according to the method of FIG. 10.

FIG. 11 illustrates example partitionings 1100a, 1100b, 1100c of the plurality of antennae 315, according to the method 1000. The example partitionings 1100a, 1100b, 1100c each include four subsets 1105, wherein each of the subsets 1105 includes four antennae 315. The four subsets 1105 do not include a reference subset or a reference antenna.

Referring now back to FIG. 10, PMIs are computed for each of the subsets 1105 at step 1010. The PMIs are computed independently of the PMI(s) of already considered subsets.

The PMIs are then transmitted to the eNodeB 305.

At step 1015, the PMIs are used to generate sub-precoders, which are in turn used to generate a precoder. The precoder can then be used to precode data for a later transmission.

It is described above that each of the subsets include four antennae 315. The person skilled in the art will, however, readily appreciate that the subsets may include any suitable number of antennae, including a plurality of antennae and a single antenna.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the phrases 'in one embodiment' or 'in an embodiment' appearing in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

Additionally, it is obvious that the present invention is not limited by the above exemplary embodiments but various modifications can be made thereto without departing from the scope of the already mentioned present invention. For example, the above exemplary embodiments explained that the present invention is a hardware configuration, but the present invention is not limited to this. The present invention can also be realized by causing a CPU (Central Processing Unit) to execute arbitrary processes on a computer program. In this case, the program can be stored and provided to a computer using any type of non-transitory computer readable media.

Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

This application is based upon and claims the benefit of priority from Australian Provisional Patent Application No. 2014902281, filed on Jun. 16, 2014, the disclosure of which is incorporated herein in its entirety by reference.

REFERENCE SIGNS LIST

R0 antenna
R1 receiver antenna
R receiver
T0, T1, T2 transmitter antennae
T transmitter
300 MU-MIMO wireless communication system
305 eNodeB
310 UE
315 antennae
400 message flow diagram
405 downlink (DL) data
410 uplink (UL) channel information (CI)
500 two-dimensional (2D) antenna array
700a, 700b, 700c example partitioning
705 reference antenna
710 partial antenna group
900a, 900b, 900c example partitioning
905 subset
910 reference subset
1100a, 1100b, 1100c example partitioning
1105 subset

What is claimed is:

1. A method of data communication in a Multiple-Input and Multiple-Output (MIMO) system including a base station comprising a plurality of antennae and a plurality of user equipments (UEs), wherein the plurality of antennae have been partitioned into a plurality of subsets of antennae, the method comprising:
   generating, at a first UE of the plurality of UEs, first channel information relating to a first subset of the plurality of subsets of antennae;
   generating, at the first UE, second channel information relating to a second subset of the plurality of subsets of antennae;
   the first UE transmitting, to the base station, the first channel information and the second channel information, for generation of a precoder; and
   the first UE receiving, from the base station, a downlink transmission precoded by a precoder determined by stacking a first sub-precoder, corresponding to the first channel information, and a second sub-precoder, corresponding to the second channel information.

2. The method of claim 1, wherein the first channel information comprises a first pre-coding matrix indicator and the second channel information comprises a second pre-coding matrix indicator.

3. The method of claim 1, wherein the MIMO system is a Multi-user Multiple-Input and Multiple-Output (MU-MIMO) system.

4. The method of claim 1, wherein the partition of the plurality of antennae into the plurality of subsets is pre-defined.

5. The method of claim 3, further including:
   receiving, at the first UE, an indicator of the plurality of subsets.

6. The method of claim 1, further comprising partitioning a matrix of a 3D communication channel associated with the plurality of antennae into a plurality of sub-channel matrices, thereby generating the plurality of subsets.

7. The method of claim 1, wherein the plurality of subsets of antennae are disjoined subsets.

8. The method of claim 6, wherein first channel information and the second channel information are jointly calculated.

9. The method of claim 6, wherein one of the plurality of subsets is a reference subset, and wherein the generating the first channel information and the generating the second channel information comprises generating the first channel information and generating the second channel information according to the reference subset.

10. The method of claim 6, wherein the generating the second channel information comprises generating the second channel information in part according to the first channel information.

11. The method of claim 1, wherein the plurality of subsets are joint subsets.

12. The method of claim 11, wherein the plurality of subsets each include one common antenna.

13. The method of claim 11, wherein the generating the first channel information and the generating the second channel information comprises generating the first channel information and the second channel information independently.

14. The method of claim 1, further comprising:
the base station generating the precoder by stacking the first sub-precoder the a second sub-precoder.

15. The method of claim 14, wherein the generating the precoder further comprises removing aspects of each of the first sub-precoder and the second sub-precoder associated with a reference antenna, prior to stacking the first sub-precoder and the second sub-precoder.

16. The method of claim 1, wherein the plurality of antennae comprises a 2D array of antennae.

17. The method of claim 16, wherein the 2D array of antennae comprises a 4×4 array of antennae.

18. The method of claim 1, wherein each of the plurality of subsets comprises four antennae.

19. A MIMO user equipment (UE) for data communication in a MU-MIMO system comprising a base station comprising a plurality of antennae, the MIMO UE comprising at least one memory storing instructions and a processor configured to execute the instructions to:
generate, at a first UE of the plurality of UEs, first channel information relating to a first subset of the plurality of subsets of antennae;
generate, at the first UE, second channel information relating to a second subset of the plurality of subsets of antennae;
transmit the first channel information and the second channel information to the base station for generation of a precoder; and
receive, from the base station a downlink transmission precoded by a precoder determined by stacking a first sub-precoder, corresponding to the first channel information, and a second sub-precoder, corresponding to the second channel information.

20. A non-transitory computer readable medium storing a control program for causing a computer of a first user equipment to perform a method of data communication in a Multiple-Input and Multiple-Output (MIMO) system including a base station comprising a plurality of antennae and a plurality of user equipments (UEs), wherein the plurality of antennae have been partitioned into a plurality of subsets of antennae, the method comprising:
generating first channel information relating to a first subset of the plurality of subsets of antennae;
generating second channel information relating to a second subset of the plurality of subsets of antennae;
transmitting, to the base station, the first channel information and the second channel information, for generation of a precoder; and
receiving, from the base station, a downlink transmission precoded by a precoder determined by stacking a first sub-precoder, corresponding to the first channel information, and a second sub-precoder, corresponding to the second channel information.

* * * * *